United States Patent [19]

Lindsey

[11] Patent Number: 4,521,198
[45] Date of Patent: Jun. 4, 1985

[54] INSTRUCTION KIT FOR USE IN MAKING FEASIBILITY STUDIES FOR ERECTING TEMPORARY POWER LINE SUPPORTS

[75] Inventor: Keith E. Lindsey, La Canada, Calif.

[73] Assignee: Lindsey Manufacturing Company, Azusa, Calif.

[21] Appl. No.: 512,118

[22] Filed: Jul. 8, 1983

[51] Int. Cl.³ .............................................. G09B 9/00
[52] U.S. Cl. ...................................... 434/224; 434/72; 434/219
[58] Field of Search ............... 434/224, 219, 379, 380, 434/72, 301

[56] References Cited

U.S. PATENT DOCUMENTS 2,105,592  1/1938  Hathaway et al. ................ 434/219
2,738,584  3/1956  Parker ............................. 434/72 X
3,277,589  10/1966  Berdan et al. ....................... 434/224

Primary Examiner—William H. Grieb
Attorney, Agent, or Firm—Sellers and Brace

[57] ABSTRACT

Provided by this invention is an instruction and training kit of modular components readily interconnectible in a variety of ways without tools or fasteners for use in conducting feasibility studies of different modes of erecting power line supports while a damaged permanent tower is being serviced. The kit consists of a multiplicity of miniature components made roughly to scale to simulate full scale components designed for assembly and temporary installation to support high potential conductors. All components, including the baseboard, are compactly storable when not in use.

20 Claims, 13 Drawing Figures

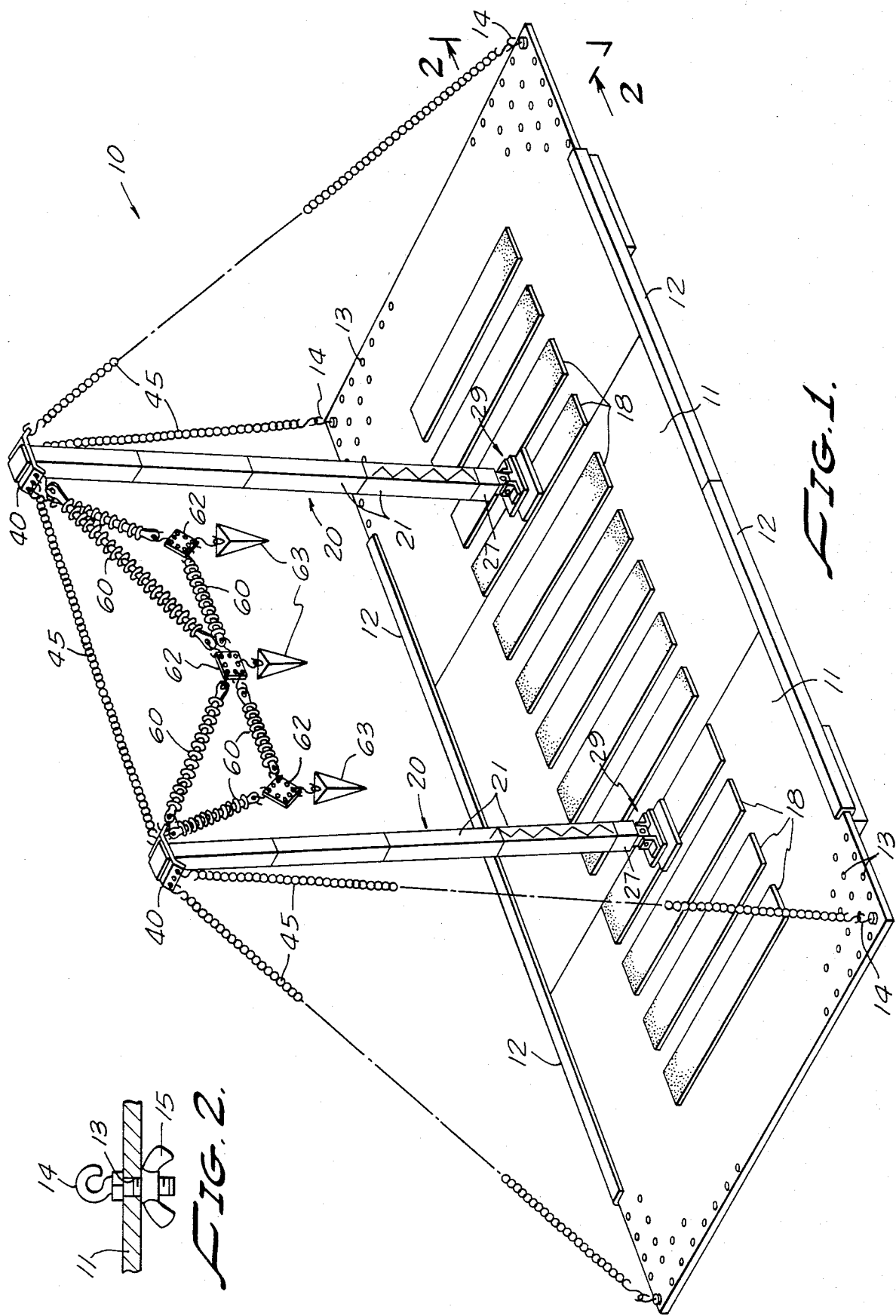

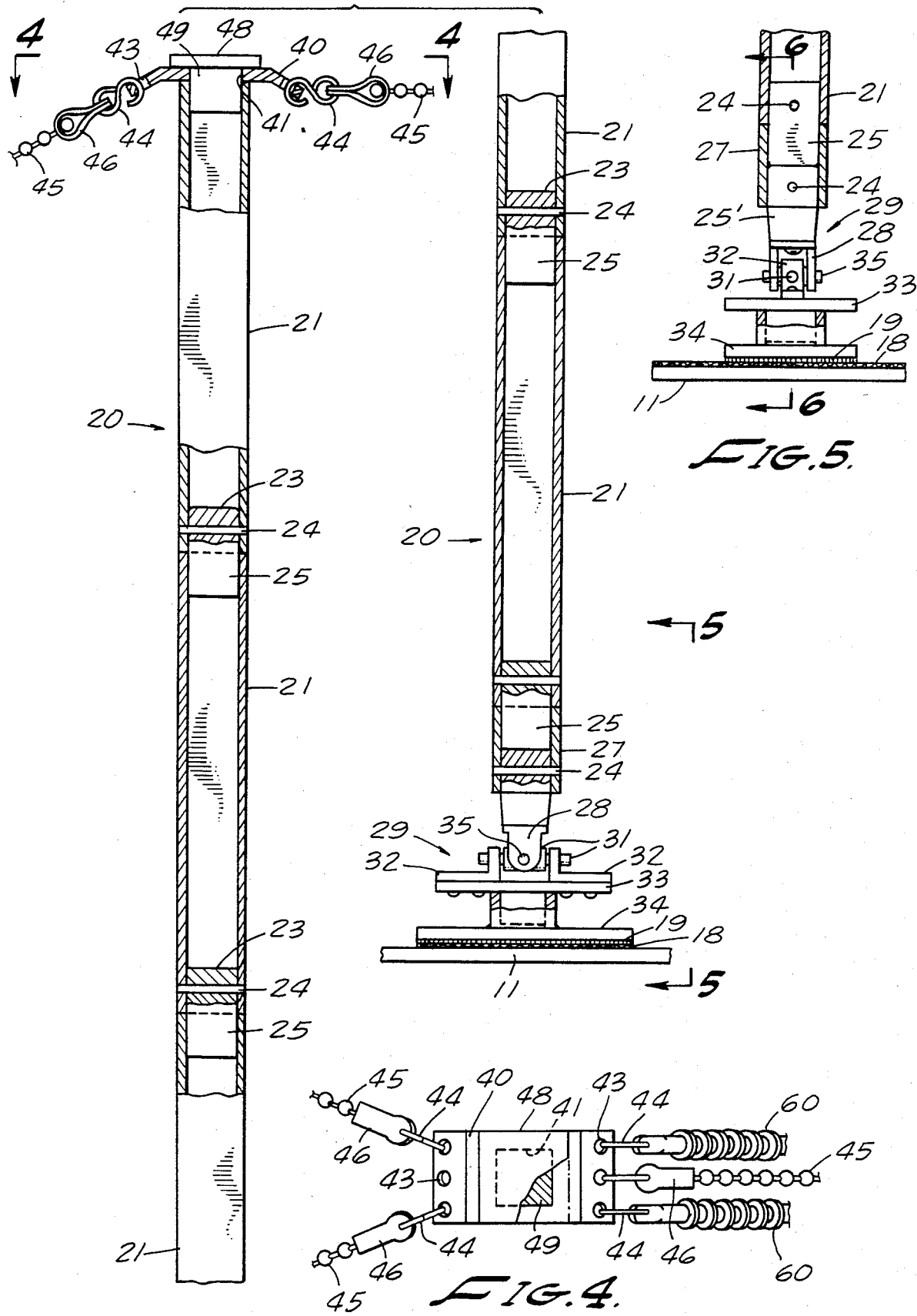

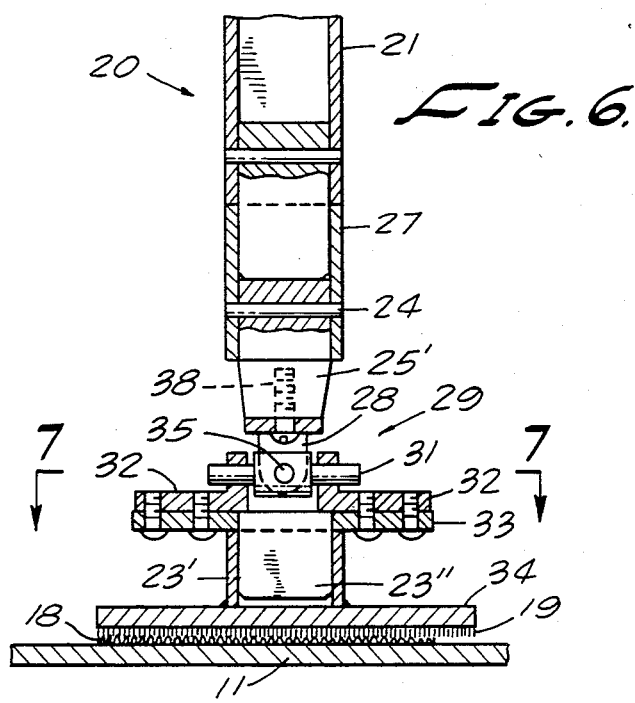
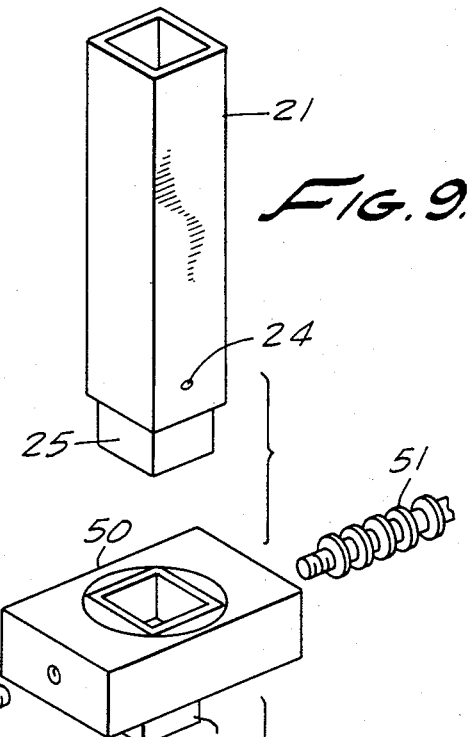
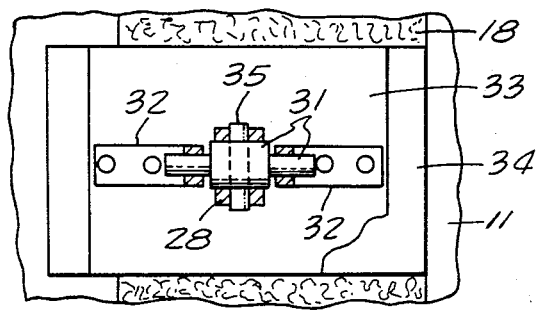
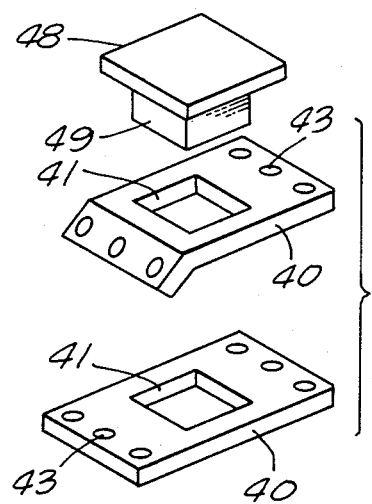
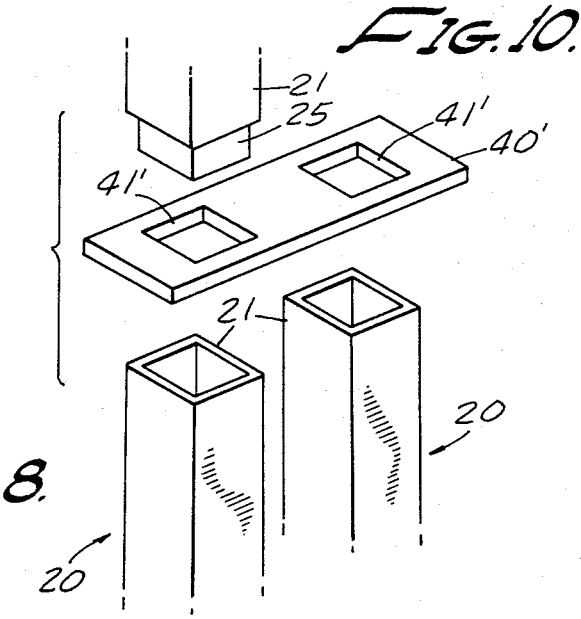

ANGLE STRUCTURES

DEAD END STRUCTURES

INSTRUCTION KIT FOR USE IN MAKING FEASIBILITY STUDIES FOR ERECTING TEMPORARY POWER LINE SUPPORTS

This invention relates to an instruction and training kit of unique design for use in training power line service crews in different modes of supporting a high potential power line pending service work on one or more damaged permanent towers.

BACKGROUND OF THE INVENTION

A variety of abnormal conditions, mishaps, accidents, etc., can cause disruption of power line service by reason of damage or failure of one or more power line supporting towers. The ensuing interruption of power supply can have extremely serious consequences to both the public utility and its customers. For example, it is roughly estimated that the average cost of service interruption on a main power line averages $500,000.00 per day. These interruptions and need for expedited service restoration operations are likely to occur in exceedingly rough and inaccessible terrain. In consequence it is not possible to utilize customary and requisite heavy duty equipment essential in servicing towers one hundred or more feet in height. The attending problems are exacerbated by the need to provide temporary power line support displaced from the installed line to permit unobstructed access for repair of the damaged towers without risk of injury to life and property.

A variety of emergency tower hardware has been proposed for providing temporary restoration of power service and there are numerous ways in which these components can be assembled and utilized to meet the requirements of a particular terrain situation. When an emergency arises there is no time for trial, error, experimentation and training of repair crews. It is mandatory that power service be restored in the quickest possible time and by the use of simple lightweight equipment capable of transport to the source of trouble over makeshift roadways and trails and quite possibly by helicopter airlift.

SUMMARY OF THE INVENTION

To meet the aforementioned needs and to provide training facilities for service crews there is provided by this invention a readily portable instruction kit of modular components simulating the components of temporary power line power facilities. These components include a knock down base board suitable for support on a desk or workbench together with a multiplicity of power line hardware designed for assembly without need for fasteners or tools. These can be assembled into any of a large variety of rigid towers rigidly supportable in an upright position by guy lines securable to the perforated baseboard. Most of the parts are interconnected by telescopic couplings. Simulated high tension insulators and conductor hardware are attachable to and between the tower assemblies in a great variety of patterns. Experimentation with the kit components is of great value in uncovering problems and in visualizing the difficulties attending erection of the towers under different conditions and make possible the adoption of procedures and operating plans best suited for optimum results without need for the crews leaving their reporting headquarters.

Accordingly, it is a primary object of this invention to provide an instruction kit of miniature modular components useful to power line installation crews in making feasibility studies of different modes of erecting temporary power line supports most expeditiously.

Another object of the invention is the provision of an instruction kit of miniature components adapted to be assembled on a desk or workbench without need for tools to represent any of a wide variety of modes of erecting temporary power line supports pending the restoration of damaged tower supports.

Another object of the invention is the provision of a compactly storable readily portable instruction kit of components readily assembled to provide temporary power line supports in a variety of sizes and arrangements while analysing the most suitable mode in a particular terrain environment.

These and other more specific objects will appear upon reading the following specification and claims and upon considering in connection therewith the attached drawing to which they relate.

Referring now to the drawing in which a preferred embodiment of the invention is illustrated:

FIG. 1 is a perspective view showing selected kit components assembled to simulate a pair of temporary towers for three high tension conductors;

FIG. 2 is a cross sectional view on an enlarged scale taken along line 2—2 on FIG. 1;

FIG. 3 is a view on an enlarged scale of one of the temporary towers shown in FIG. 1 with portions broken away to show structural details;

FIG. 4 is a fragmentary top plan view taken along line 4—4 on FIG. 3;

FIG. 5 is an elevational view of the gimbal joint at the bottom of the temporary tower and taken along line 5—5 on FIG. 3;

FIG. 6 is a cross sectional view on a slightly enlarged scale taken along line 6—6 on FIG. 5;

FIG. 7 is a fragmentary cross sectional view taken along line 7—7 on FIG. 6;

FIG. 8 is an exploded perspective view of components selectively assembleable to the top of a temporary tower;

FIG. 9 is an exploded perspective view showing a connector or block for supporting horizontally disposed line insulators between a pair of intermediate tower components;

FIG. 10 is a perspective exploded view of a plate insertable between adjacent tower components and usable for splicing two tower assemblies together;

Figure 11:
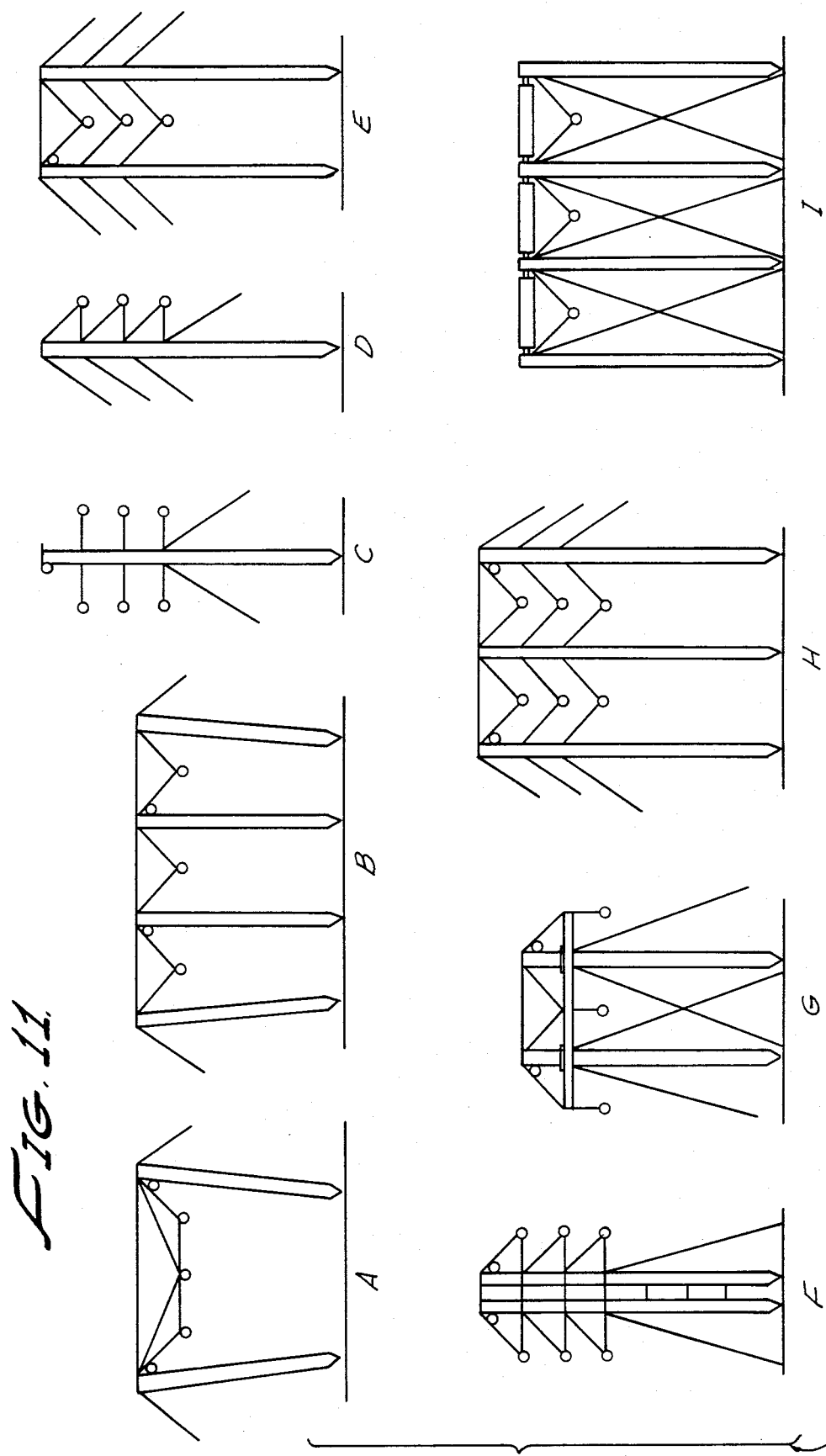
FIG. 11 is a diagrammatic showing of nine different modes of erecting tangent tower structures.

Referring now more particularly to FIG. 1, there is shown selected portions of the invention kit assembled to represent a pair of temporary towers along with high tension insulators arranged to support a three phase high tension power line, the assembly being designated generally 10. This assembly includes a base board formed of three different plaques of pegboard 11 firmly anchored in edge-to-edge assembly by two pairs of channel shaped clips 12 sized to have a snug frictional fit over the opposite edges of the several plaques. The plaques are provided with a multiplicity of closely spaced holes 13 to receive eyelets 14 equipped with thumb nuts 15 (FIG. 2). These eyelets can be mounted in any selected one of the openings 13 as an anchorage for the tower assembly guy lines to be described in greater detail presently.

An important feature of plaques 11 is the provision of strips 18 firmly bonded or anchored thereto in any suitable way and equipped on their upper surfaces with a multiplicity of loops or loosely arranged interlocking fibers well known to persons skilled in the separable fastener art available under the trademark Velcro.

These strips are separably interlockable with strips 19 (FIG. 6) bonded or otherwise secured to the lower surface at the bottom of the temporary tower assemblies. Typically, the fastener strips 19 are provided with a multiplicity of resilient barbs which readily interlock with the fibers or loops on strips 18.

The tower assemblies, designated generally 20, comprise a plurality of tubular tower sections 21. As is best shown in FIG. 3, one end of each section 21 includes a male protrusion 23 suitably anchored within the tube as by a pin 24 and the other end or half 25 protruding beyond the section sufficiently to telescope into and form a snug coupling with the open end of another one of the sections 21. All tower sections 21 are of the same construction but may differ in length to permit erection of simulated temporary tower assemblies of desired heights.

The lower end of each tower assembly 20 preferably includes a specially constructed gimbal section 27 the constructional details of which are best illustrated in FIGS. 3, 5 and 6. The upper end of gimbal section 27 comprises a truncated pyramid of the same maximum girth as sections 21. The uppermost end of the gimbal section has a well to receive the male portion 25 of a section 21. The gimbal per se, designated generally 29 comprises a yoke 28 straddling the enlarged midlength of a shaft 31 to which the yoke is connected by a shaft 35 extending at right angles to shaft 31. The opposite ends of shaft 31 are journalled in brackets 32 fixed to a plate 33. Plate 33 is provided with a protrusion 23 which has a detachable telescopic fit within a tube 23' fixed to base plate 34. It will be recognized that the axes of shafts 31 and 35 lie in a common plane and at right angles to one another. It will also be understood that the protrusion 25' projecting downwardly from the lower end of the tubular section 27 of the gimbal is secured to yoke 28 by a screw 38 having a snug fit in a threaded bore of member 25'. The cross piece of yoke 28 has a loose rotary fit with the shank of screw 38 thereby permitting the yoke to swivel about screw 38 on an axis normal to the intersection of the axes of pins 31 and 35. Accordingly, the upper end of the gimbal assembly 29 is free to rotate about the axis of screw 38 without any tendency to loosen this screw and can also pivot in any radial plane in which the axis of screw 38 lies.

Other fittings forming a part of the invention construction kit are shown in FIGS. 3 to 6 and 8-10.

Referring first to FIG. 4, there is shown an elongated guy plate 40 having a square opening 41 in its midportion sized to have a loose fit about the square protrusion 25 of any tower section 21. The opposite ends of guide plate 40 are provided with a row of holes 43 to receive hooks 44 securable to the opposite ends of each of the flexible bead in socket guy lines 45. The guy lines 45 include an adjustable coupling 46 (FIG. 3) of a type well known to those in the flexible chain art having provision for easily and readily connecting connector 46 to any one of the balls in the line thereby to vary the effective length of the guy line. Plate 40 can be inserted and held firmly in place between the telescopically joined ends of adjacent tower sections 21. Alternatively, the guy plates 40 may be coupled to the top of a tower assembly 20 as is best shown in FIG. 3 utilizing a flanged cap 48 having a shank 49 shaped to pass through opening 41 in the plate and into the open end of a tower section 21.

FIG. 8 shows slight variations in the design of the guy plates 40 and FIG. 10 shows a further variant in which the plate 40' is substantially longer than guy plate 40 and is provided with a pair of square openings 41' adjacent its ends. Plate 40' is known as a double splice plate useful in anchoring a pair of closely spaced parallel tower assemblies 20—20 to one another when the plate 40' is inserted between adjacent coupling sections of a pair of tower assemblies as is indicated in FIGS. 10, 11F and 13Q.

FIG. 9 shows another coupling component designated a box section 50 designed to be coupled between the ends of adjacent tower sections 21, 21 when it is desired to mount post insulators 51 along one or more sides of a tower assembly at points between its opposite ends. Box section 50 is provided with a square tubular insert having a downwardly projecting square section 52 sized to have a telescopic fit within the open upper end of a tower section 21. The upper end of protrusion 52 is enlarged and fixed to box section 50 and has an opening sized to have a telescopic fit with protrusion 25 of an overlying tower section 21.

Other fittings, shown by way of example in FIG. 1, include a plurality of simulated insulators 60 of assorted lengths each provided with hooks 44 similar to those in the guy lines 45 to facilitate the assembly of the insulators between openings of the guy plates and connector plates 62. Connector plates 62 include a plurality of holes about their perimeters useful in interconnecting the ends of insulators 60 to one another and to a tower, as for example, in the manner illustrated in FIG. 1. Weights 63 can be hooked into an opening of each of the plates 62 to simulate the weight and positions of conductors supportable by the insulator strings.

Figure 12:
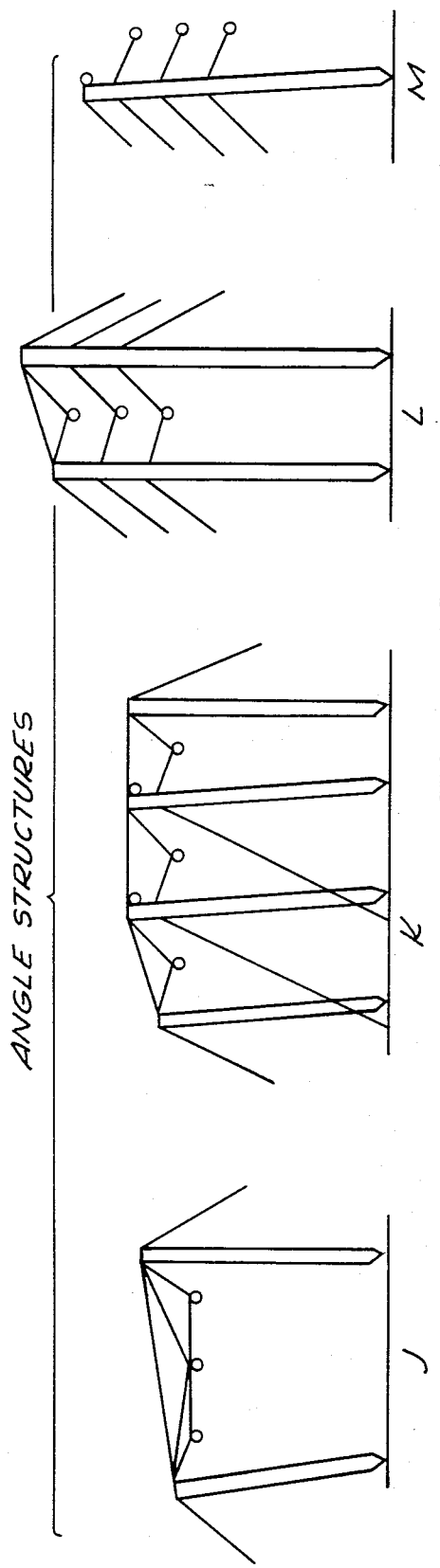
FIG. 12 is a diagrammatic showing of four different modes of erecting temporary angle tower assemblies.
Figure 13:
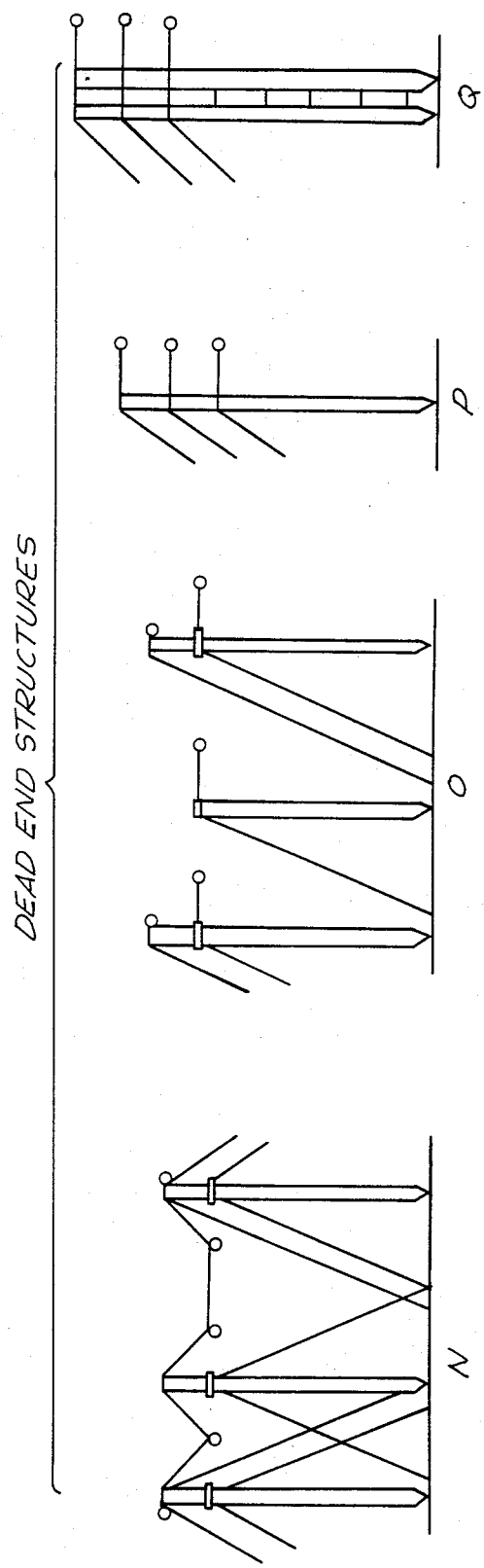
FIG. 13 shows four different modes of erecting temporary dead end tower structures.

FIGS. 11–13 illustrate some of the numerous ways in which the kit components can be assembled and supported on base board 11. Each of the diagrammatic views shows at least one tower assembly 20 including two or more sections 21 and a base or gimbal section 27 anchored to the baseboard 11 by guy lines 45. Also supported at the upper ends of the tower sections are strings of insulators 60 arranged in various patterns from the upper ends of the tower assemblies or having one end seated in an opening in a box section 50. It will also be understood that some of the tower sections 21 can be supported crosswise of upright tower assemblies by providing either or both with telescoping connectors to provide simulated temporary tower assemblies of the type illustrated in FIGS. 11F and 11I.

FIG. 12 is a diagrammatic illustration of the manner in which the kit components can be assembled and erected on the baseboard with one or more of the tower assemblies in a non-vertical position as is desirable, for example, in supporting power conductors at a bend in the power line.

FIG. 13 shows different ways of utilizing the kit components to assemble dead end tower structures, it being noted in all instances that the tower assemblies include a plurality of rigid tower sections and a gimbal tower section at the base thereof.

In the use of the instructional training kit, the components of only typical ones of which are illustrated in the drawings but of which there are numerous duplicates in the kit. All components are compactly storable in a case in a disassembled condition. The first step is to remove these baseboard plaques 11 and to couple them together by clipping strips 12 over the aligned edges of adjacent plaques. The next step is to select components necessary to form a tower assembly 20 of desired length. The gimbal section 27 is attached to the lower end of assembly and its base plate 34 is pressed against a selected position of one of the connector strips 18 on the baseboard. At this time the tower assembly 20 will usually be lying on the baseboard and the crew making a feasibility study will decide how it can best be erected while its gimbal section is anchored to the baseboard by internested portions of the Velcro fasteners 18, 19.

In the case of higher tower assemblies it may not be feasible to erect a fully assembled tower 20 but instead to adopt a plan for erecting a lower section and then considering the advantages of assembling the upper portion by air lift, or by mobile crane if the particular terrain represented by the assignment permits movement of the required crane to the area. If this is not possible, then it may be necessary to consider the advantages of a different temporary tower installation. These and the like ever changing situations can be given careful consideration by a crew engaged in a training exercise by trial and error without leaving their office.

While the particular instruction kit for use in making feasibility studies for erecting temporary power line supports herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. An instruction kit of miniature modular restoration components adapted for use in making feasibility studies of different modes of erecting temporary powerline supports while restoring damaged powerline tower supporting means, said kit comprising:
    a baseboard;
    a multiplicity of tower components having the ends thereof provided with a separable coupling fitting adapted to seat a complementary shaped coupling fitting at the end of another one of said tower components;
    said tower components including a plurality of gimbal components having a base at one end thereof and a separable coupling fitting at the other end thereof shaped and sized to seat a selected one of said tower components;
    a plurality of guy lines;
    a plurality of guy line anchor components a selected one of which is separably mountable on the upper end of each tower assembly formed by an end-to-end assembly of a selected number of said tower components;
    readily separable means for anchoring a tower assembly to a selected area of said base board; and
    a plurality of guy lines adapted to be connected between outer areas of said baseboard and the said guy line anchor components assembled to the upper end of said tower assemblies and effective to support at least one of said tower assemblies in a desired generally upright position.

2. An instruction kit as defined in claim 1 characterized in that said baseboard comprises a plurality of plaques of generally similar size and shape, and means for holding said plaques in a common plane and in side-by-side relation.

3. An instruction kit as defined in claim 2 characterized in that said means for holding said plaques in a common plane comprises rigid clip means embracing the opposite lateral edges of a plurality of adjacent ones of said plaques.

4. An instruction kit as defined in claim 1 characterized in that said plaques are provided with a multiplicity of openings selectively usable as an anchor for the lower ends of said guy lines.

5. An instruction kit as defined in claim 1 characterized in that said baseboard is provided with one half of two part separable coupling means fixed to major portions of the upper surface thereof and adapted for use in detachably anchoring the lower end of one of said tower assemblies thereto.

6. An instruction kit as defined in claim 1 characterized in that said baseboard is provided with a plurality of separable coupling halves fixed to spaced apart areas thereof for use in detachably anchoring the lower ends of different tower assemblies thereto in a desired pattern.

7. An instruction kit as defined in claim 1 characterized in that said fittings are each provided with an exposed end on which is mounted a coupling half mateable with a coupling half on said baseboard.

8. An instruction kit as defined in claim 5 characterized in that said separable coupling means includes a first half provided with a multiplicity of closely spaced barbs and a second half provided with a multiplicity of closely spaced apart loop-like filaments mateable with said barbs of said first half.

9. An instruction kit as defined in claim 1 characterized in that a majority of said tower components include elongated members having an axial protrusion at one end and an axial well at the opposite end shaped and sized to have a telescopic fit with the axial protrusion of a selected other one of said tower components.

10. An instruction kit as defined in claim 9 characterized in that the upper end of said gimbal component is provided with gimbal fittings including means for telescopic assembly with a selected one of said first mentioned tower components.

11. An instruction kit as defined in claim 1 characterized in that said gimbal component includes means for and are so constructed that the upper end thereof is pivotable in any vertical plane relative to the longitudinal axis thereof before the attachment thereto of said guy lines.

12. An instruction kit as defined in claim 1 characterized in the provision of guy line coupling means telescopically mateable with the upper end of one of said tower components, said guy line coupling means including means for detachably connecting thereto the upper ends of a plurality of said guy lines.

13. An instruction kit as defined in claim 1 characterized in the provision of a plurality of power line supporting components, including insulator simulating components, having means for holding the same detachably assembled to a selected length of said tower assembly.

14. An instruction kit as defined in claim 1 characterized in the provision of sufficient ones of said components to assemble a plurality of said tower assemblies each supported at the lower end thereof by a gimbal component together with sufficient guy lines to hold said tower assemblies rigidly mounted in spaced apart positions on said baseboard, and sufficient insulators and conductor suspension hardware connectible to the upper ends of said tower assemblies to simulate the suspension of a plurality of power conducting cables.

15. An instruction kit as defined in claim 14 characterized in the provision of guy line anchor means having an opening therethrough adapted to receive and fit about said protrusion at one end of said tower components and effective to hold assembled thereto when said protrusion is assembled to the axial well of another tower component.

16. An instruction kit as defined in claim 1 characterized in the provision of a plurality of insulator support fittings each having an axial well at one end and a complementary shaped protrusion extending from the other end thereof adapted to be captively assembled between the adjacent ends of a selected adjoining pair of said tower components, said insulator support fittings having openings on at least one end thereof, and a plurality of conductor insulators having means at one end sized to have a telescopic fit with said openings.

17. An instruction kit of miniature modular components useful in making feasibility studies of different modes of providing a temporary support for high tension conductors while servicing a damaged powerline tower, said kit comprising:
 a plurality of each of a variety of components readily interconnectible to provide a variety of powerline supports, said components including:
  (a) elongated rigid tower sections having an axial protrusion at one end and an axial well at the other end sized to telescope snugly into the well of another tower section to form a tower assembly;
  (b) plate means having an opening to fit over a selected one of said protrusions and to be held assembled transversely of and between the adjoining ends of a pair of said tower sections;
  (c) guy lines connectible between said plate means and a base support for the lower ends of said tower assembly, and
  (d) elongated conductor insulator simulating components adapted to be detachably supported from the upper end portions of said tower assembly.

18. An instruction kit as defined in claim 17 characterized in that said components include a non-rigid tower section having a pivoting and rotary unit at the lower end thereof and a coupling at the upper end thereof shaped and sized to have a telescopic fit with one end of said elongated tower section, the other end of said non-rigid tower component having a base adapted to be anchored to a supporting surface for an assembled tower assembly.

19. An instruction kit as defined in claim 17 characterized in that said guy lines include a plurality of interconnected links to facilitate the use thereof in supporting said tower assembly firmly in a desired generally upright position.

20. An instruction kit as defined in claim 18 characterized in that said pivoting and rotary unit of said non-rigid tower section includes a gimbal having a pair of pivot axes extending transversely thereof and crossing one another at right angles and rotary means connecting said gimbal to the adjacent end of said non-rigid tower section on an axis at right angles to said pair of pivot axes.

* * * * *